United States Patent [19]

Wymore

[11] Patent Number: 4,944,107
[45] Date of Patent: Jul. 31, 1990

[54] FIXED AND SLIDING FISHING SINKERS

[76] Inventor: Roger S. Wymore, 4612 F Ave. NE., Cedar Rapids, Iowa 52402

[21] Appl. No.: 280,308

[22] Filed: Dec. 5, 1988

[51] Int. Cl.$^5$ ............................................. A01K 95/00
[52] U.S. Cl. .................................................. 43/44.89
[58] Field of Search ................. 43/44.89, 44.81, 43.14, 43/43.12, 43.83

[56] References Cited

U.S. PATENT DOCUMENTS

| | | | |
|---|---|---|---|
| 399,866 | 3/1889 | Gage | 43/44.89 |
| 2,459,287 | 1/1949 | Robbins et al. | 43/44.89 |
| 2,501,634 | 3/1950 | Rector | 43/44.89 |
| 2,683,325 | 7/1954 | Sharp | 43/43.14 |
| 2,701,427 | 2/1955 | Vironda | 43/44.89 |
| 2,957,267 | 10/1960 | Dempsey | 43/43.12 |
| 3,084,469 | 4/1963 | Stratton | 43/43.14 |
| 3,557,486 | 1/1971 | Wright | 43/44.89 |

Primary Examiner—M. Jordan

[57] ABSTRACT

A spherical sinker commonly referred to as split shot having a mouth with sine wave shaped teeth and a relief groove on the opposite side of the sphere with steps above and below as pressure points. Pressure on the steps can rotate the jaws open releasing the line for sinker removal.

A conically shaped sinker commonly referred to as a worm weight, the body of which is separated into two halves and integrally connected by a longitudinal portion which acts as a hinge located to one side of the center hole space. The deeper groove thus formed accepts the fishing line and the opposite groove serves as rotational relief. Four small protrusions form two pairs of lien containers and meet at the center of the line groove space on the opposite side of the centerline from the hinge. Each pair is located near either end of the cone. Opening the sinker to install the line consists of separating the container protrusions to slip the line into the center. Pressing the two halves together locks in the fishing line but allows slidable movement of the sinker on the line. Removal is preformed by prying open the line groove.

A plurality of hook type appendages, attached integrally by molding to any configuration of sinker body, act as a slip on slip off attachment means. The hooks are aligned collinearly and parallel but with openings reversed. Spaced apart approximately the thickness of ordinary fishing line, the hooks form an eye. With the line rotated into place within the eye and the hooks pressed together, a continuous collar is formed about the line. The eye is large enough for the sinker to slide on the fishing line. Removal is accomplished by prying the hooks apart.

4 Claims, 1 Drawing Sheet

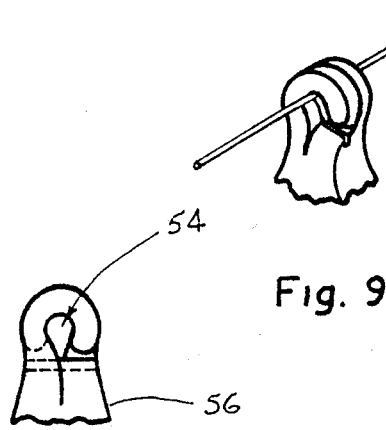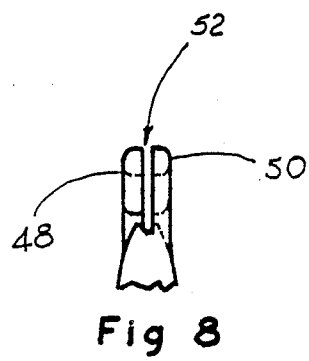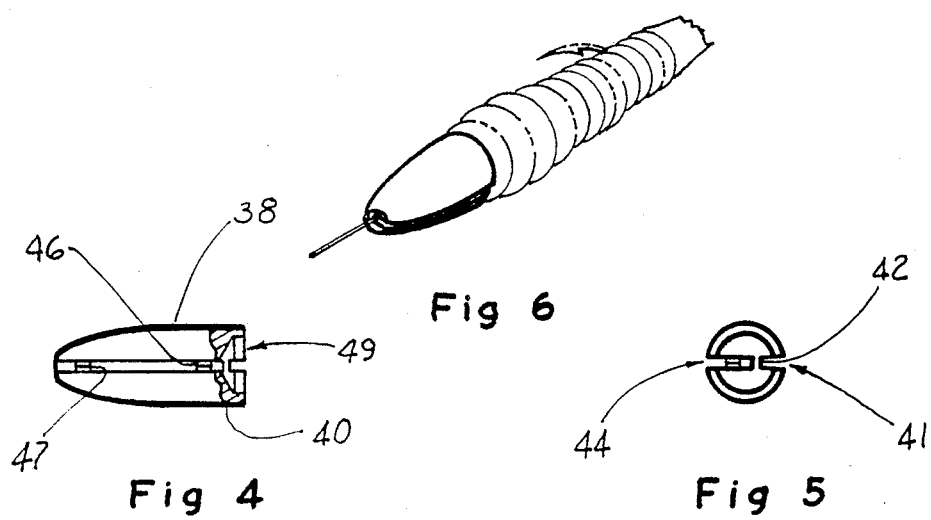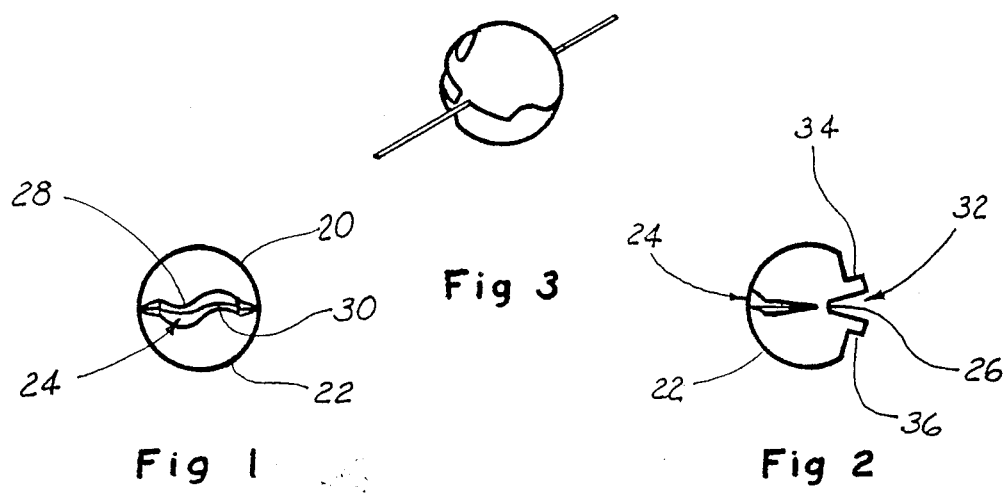

FIXED AND SLIDING FISHING SINKERS

BACKGROUND—FIELD OF INVENTION

This invention relates to sport fishing tackle, especially to weighting line, hook and bait so that the bait can achieve a more advantageous depth for catching fish and most especially so the fisherman can spend less time preparing to fish and more time fishing.

BACKGROUND—CROSS REFERENCE TO RELATED APPLICATIONS

I have filed a previous application which is of a related nature. It is under serial number 07/235,049 filed 08/23/88.

BACKGROUND—DESCRIPTION OF PRIOR ART

The two most highly used fishing sinkers in the United States and probably the world aree split shot and worm weights. Split shots, because of size, variety and ease of application to the line, are far and away the leader in total sales. Worm weights are next in usage due to the adoption by Bass fishermen. Bass fishing, through organized tournaments offering huge prizes, has drawn together the largest and most active organized group of fishermen in existence.

Split shot have changed very little in recent years. The major change has been the addition of a line of split shot comprising two tails which are useful as leverage in opening the jaw of the sinker for removal from the line. Although very handy, these tails have a tendency to revolve the split shot thus twisting the line. As a result the originals, made without tails, are still beeing sold. Both are fixed sinkers and clamp onto the line. The jaws are fitted with a single tooth somewhat resembling a truncated triangle in cross-section which extends from the spherical surface into the hinge. An opposing groove allows the tooth to nestle into the other half of the sphere when closed.

The worm weight is a conically, or bullet shaped sinker with a longitudinal hole for the line and a concave depression at the blunt end. The fishing line is cut and threaded through the weight from the pointed end to the blunt end. It is then tied to a hook and the hook is fitted with a plastic worm. The worm weight slides down the line to the hook and the concavity allows partial acceptance of the head end of the worm and it is ready for fishing. There are several different conical configurations but all are essentially the same. All require cutting the line to install.

The attachment means offered herein is a substitute for loop or ring attachment means commonly found in use on bell, pyramid and walking sinkers. The former two are now produced with wire, or plastic loops attached to the body of the sinker. The latter is generally manufactured with an integrally molded loop of the sinker material.

OBJECTS AND ADVANTAGES

Accordingly I claim the following as our objects and advantages of the invention: to provide a new and novel type of split spherical sinker for the fishing industry which will place less trauma on the line than conventional clamp-on balls and also to be easily removable. However, instead of the levers protruding from the sphere the leverage can be contained within the sphere thus removing the surfaces that provide the rolling motion which results in line twist.

Additionally, I claim as our object and advantages of the invention: to provide a new and novel worm weight for Bass fishing. The sinker will never require the line to be severed for the purpose of adding or changing worm weights yet will provide a sleek and weed-free shape. The only difference is two longitudinal grooves, one along each side.

Additionally, I claim as the object and advantage of this invention: to provide a new and novel appendaged ring but formed integrally of the sinker material. The eye is formed by two collinear, parallel hooks facing in opposite directions. The hooks are separated enough to slip a fishing line between them. The hook-eye thus formed will provide attachment means for a wide variety of popular sinkers presently in use. Its advantage is the line need not be severed during the process of installation on the line. It provides for either a sliding or fixed application as with any ring type attachment means.

DRAWING FIGURES

FIG. 1 shows an orthographic front view of a split spherical sinker drawn according to the invention.

FIG. 2 shows an orthographic side view of FIG. 1.

FIG. 3 is a pictorial view of the spherical sinker closed on a section of fishing line.

FIG. 4 shows an orthographic side view of the split worm weight drawn according to the invention.

FIG. 5 shows an orthographic end view of the split worm weight.

FIG. 6 is a pictorial view of the split worm weight in position against the head of the worm ready for fishing.

FIG. 7 shows an orthographic view of the hook-eye attachment means drawn as molded and according to the invention.

FIG. 8 shows an orthographic side view of the hook-eye attachment means.

FIG. 9 is a pictorial view of the hook-eye appendage on the fishing line in a sliding mode with the hooks pressed into contact.

DRAWING REFERENCE NUMERALS 20 top element
22 bottom element
24 mouth groove
26 living hinge
28 top tooth
30 bottom tooth
32 relief slot
34 top pressure step
36 bottom pressure step
38 top body element
40 bottom body element
41 relief groove
42 hinge
44 line groove
46 top line container
47 bottom line container
49 worm relief
48 front hook
50 rear hook
52 separating groove
54 eye
56 sinker body

FIXED AND SLIDING SINKERS—DESCRIPTION

FIG. 1 and FIG. 2 show all the essential elements of the embodiment of the split spherical sinker invention. The sinker is comprised of a top element 20 and a bottom element 22 separated by a mouth groove 24 and a relief slot 32. The elements are held together by a rectangular, prismatic living hinge 26. Above the relief slot 32 is a pressure step 34 cut into the top element 20. Mirror imaged into the bottom element 22 is a second pressure step 36. FIG. 3 shows the sinker clinched onto a segment of fishing line.

FIG. 4 and FIG. 5 show all the essential elements of the embodiment of the invention with respect to the worm weights. This sinker is comprised of a conically shaped body divided symmetrically into a top body element 38 and a bottom body element 40 by a line groove 44 and a relief groove 41. A rectangular prismatic living hinge 42 connects the two body elements and is located parallel with, and a short distance to one side of, the longitudinal centerline. The same distance to the opposite side of the centerline within the line groove are two line containers. The top line containers 46 are integrally connected to the top body element 38 and the bottom line containers 47 are integrally connected to the bottom body element 40. The top and bottom line containers 46 and 47 meet at or near the center plane of the line groove 44. The blunt end of the sinker is indented and is referred to herein as a worm relief 49. The relief groove 41 is given draft for removal from molds.

FIG. 6 and FIG. 7 show all the essential elements of the embodiment of the appendaged hook-eye invention. Molded on to a common sinker shape such as a bell sinker or pyramid or walking sinker it consists of two parallel, collinear and opposite facing hooks. The front hook 48 is removed from the rear hook 50 by the width of the separating groove 52. FIG. 7 shows that an eye 50 is formed by lining up with the opposite facing hooks.

FIXED AND SLIDING SINKERS—OPERATION

The split spherical sinker is applied to the fishing line by placing the line in the mouth groove 24 adjacent to the wall of the living hinge 26. Applying coupled pressure to the top and bottom elements 20 and 22 can close the mouth groove 24 upon the line. The height of the teeth 28 and 30 at the throat of the mouth groove 24 is fairly shalow. The height of the teeth grow to a maximum at the surface. The mesh of the teeth keeps the line from escaping even if the user fails to fully clench the teeth together. Coupled pressure on the top and bottom pressure steps can rotate the mouth to an open position and thus releasing the pressure on the line for removal.

The worm weight is used by first placing the fishing line against the hinge 42 in the line groove 41 with the blunt end toward the worm. Application of coupled pressure to the top and bottom body elements 38 and 40 causes the line containers 46 and 47 to come together thus locking the line in the center of the sinker. The fishing line has enough clearance to allow the sinker to slide on the line. The blunt end slides to the plastic worm, or whatever is applied to the hook. Removal can be accomplished by prying open the line groove thus opening the line containers and freeing the line.

The appendaged hook-eye arrangement is used simply by sliding the fishing line between the two hooks 48 and 50 and then rotating the sinker or line approximately ninety degrees. Application of coupled pressure deforms the material so that the hooks make permanent contact with each other thus closing off any route of escape for the fishing line. Spreading the hooks apart allows removal of the fishing line from the sinker.

I claim:

1. A fishing sinker comprising a spherical body with two spherical segments removed from opposite sides and centered on an equatorial plane of said sphere, a mouth segment extending past the center line and having formed into two surfaces of groove a curve approximating a sin wave of $y = \sin x$, said curves center, where x is equal to zero, being on a perpendicular bisector of a throat line of the mouth segment, the curve gradually lessening in amplitude until nearly a straight line at said throat line, the other removed segment being truncated but whose surfaces projected approximately intersect the mouth segment throat line said truncated portion remaining forming an integral hinge and connecting the two remaining segments of said body, two steps, one above and one below the second removed section forming nearly parallel surfaces whereby coupled pressure applied to these surfaces can revolve open the mouth groove about said hinge for removal of fishing line, the fixing of the sinker on said fishing line occurring by coupled pressure on the opposite side of the hinge and to the spherical surfaces.

2. A fishing sinker conically shaped with a concave blunt end and a longitudinal hole collinear with a longitudinal center line, said hole being intruded into by a lengthwise groove of approximately the holes diameter, the sides of said groove being tangent to said hole, a second rectangular groove intruding the surface of said cone on the opposite side from the first groove and stopping at a plane parallel to said hole and far enough away to allow the remaining material to form an integral hinge, additionally, protruding from each surface of the first groove near each end and tangent to the original longitudinal hole, two pairs of studs meet at approximately the center of the groove whereby prying open the first groove parts said studs for fishing line entry and pressing closed the studs trap said line within the center hole allowing secure sliding of the sinker up and down the fishing line.

3. A fishing sinker conically shaped with a concave blunt end and a longitudinal hole collinear with a longitudinal center line, said hole being intruded into by a lengthwise groove of approximately the holes diameter, the sides of said groove being tangent to said hole, a second rectangular groove intruding the surface of said cone on the opposite side from the first groove and stopping at a plane parallel to said hole and far enough away to allow the remaining material to form an integral hinge, additionally, protruding from each surface of the first groove near each end and tangent to the original longitudinal hole, two approximately rectangular protrusions meet at approximately the center of the groove whereby prying open the first groove parts said protrusions for fishing line entry and pressing closed the protrusions trap said line within the center hole allowing secure sliding of the sinker up and down the fishing line.

4. A fishing sinker device being an integrally molded ring-like attachment means of a single material for various sinker forms whereby the sinker body will hang securely from a fishing line in slidable fashion yet be easily attached or detached from the line without severing the line, a plurality of collinear hook appendages molded integrally to a sinker body and of the same material, openings in adjacent hook appendages being open to opposite sides of the sinker whereby a fishing line can be placed crossways between the hooks then down into hook openings and directly into the eye and collinear with said eye, the hooks being pressed together forming a continuous collar loosely but securely about said fishing line.

* * * * *